June 19, 1951     W. M. MAGNESS     2,557,881
SPUDDING WHEEL
Filed Feb. 4, 1947
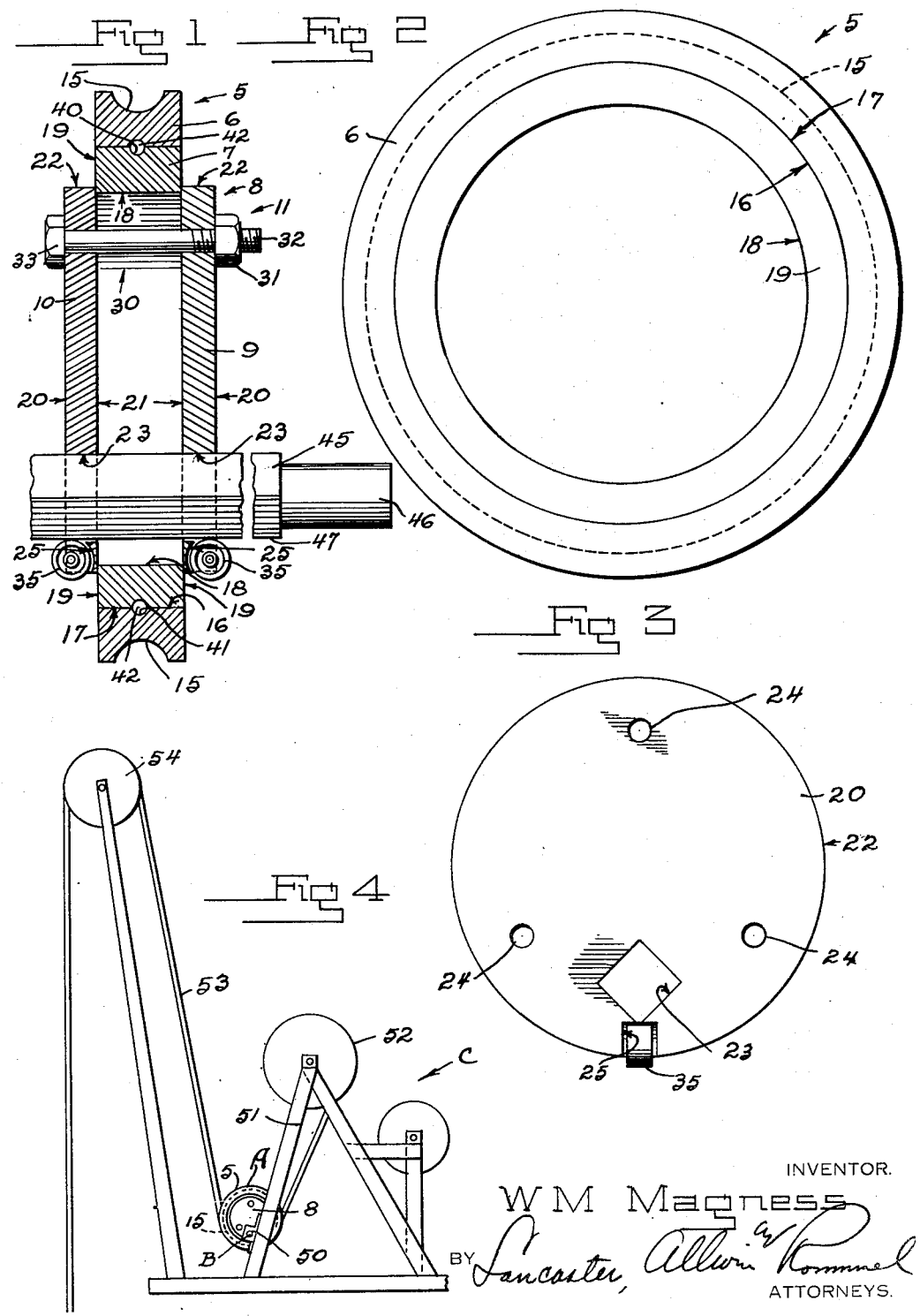
INVENTOR.
WM Magness
BY Lancaster, Allwine Rommel
ATTORNEYS.

Patented June 19, 1951

2,557,881

UNITED STATES PATENT OFFICE 2,557,881

SPUDDING WHEEL

William Mark Magness, Seminole, Okla.

Application February 4, 1947, Serial No. 726,402

2 Claims. (Cl. 242—157)

This invention relates to mechanisms which may be employed, for example, in well drilling operations.

An important object of the invention is to provide a mechanism, including an eccentric member or spudding wheel, which permits a very compact assembly for efficient well drilling operations.

Another important object is to provide a spudding mechanism which, when employed, decreases the average time for spudding operations, for example.

Other objects and advantages of the invention will be apparent during the course of the following detailed description of this invention, taken in connection with the accompanying drawing, forming a part of this application, and in which drawing:

Figure 1 is a vertical section of the novel mechanism.

Figure 2 is a plan of the outer member forming a part of the spudding wheel forming an important part of the mechanism.

Figure 3 is a plan of the inner member forming a part thereof.

Figure 4 is a view, generally diagrammatic, illustrating the novel mechanism in use.

In the drawing, wherein for the purpose of illustration is shown a preferred embodiment of the invention and wherein similar reference characters designate corresponding parts throughout the several views, the letter A designates the novel mechanism; the letter B a shaft associated therewith; and C a portion of a rig.

The novel mechanism A includes an outer member 5 which preferably comprises two portions 6 and 7; an inner member 8 which preferably comprises two portions 9 and 10; means 11 to secure the portions 9 and 10 together and in contact with the member 5; and means to facilitate lateral shifting of the mechanism A along the shaft B.

Referring mainly to Figures 1 and 2, it may be seen that the outer member 5 is of ring shape, with the outermost portion 6 thereof having a circumferentially grooved outer periphery 15 and an inner periphery 16, while the innermost portion 7, also of ring shape, has an outer periphery 17 in relatively rotatable contact with the inner periphery 16, an inner periphery 18 which, of course, forms the inner periphery of the member 5, and substantially flat outer, parallel faces 19.

Now, referring mainly to Figures 1 and 3, it may be seen that the portions 9 and 10 of the inner member 8 are shown as a pair of discs, each having an outer substantially flat face 20 and inner substantially flat face 21, a peripheral face 22, a non-circular opening 23, spaced from the axial center of the disc, and extending from the face 20 to the face 21, and a suitable number of bolt shank-accommodating openings 24. In the example shown, there are three spaced-apart openings 24 in each disc, extending from the face 20 to the face 21, and these openings 24 in one disc are axially aligned with those in the other disc. Extending inwardly from the outer face 20 of each portion 9 and 10 is a radially-extending slot 25, for a roller (to be described) with each slot extending to the non-circular opening 23. The two openings 23 are aligned, one with the other, and in the example shown, each opening 23 has four walls forming substantially right angles, providing a square opening, with the opening 23 disposed preferably closely adjacent the periphery 22 of each member 9 and 10 and one juncture of two walls of the opening 23 (that is one corner of each opening 23) being closest the periphery 22. As a consequence the radially-extending slot 25 in each portion 9 and 10 may extend to this juncture for a purpose to be subsequently detailed in connection with the lateral shifting means.

The means 11 to secure the portions 9 and 10 together and in contact with the member 5 may be bolts 30 and nuts 31 therefor, with the shanks 32 of the bolts 30 accommodated in the openings 24, the heads 33 thereof bearing against the outer face 20 of one portion or disc and the nuts 31 upon the shanks 32 bearing against the outer face 20 of the other portion or disc when the two portions are disposed as in Figure 1.

As may be seen in Figure 1, the sections of the inner faces 21 of the portions 9 and 10 adjacent the peripheries 22 bear against the sections of the outer faces 19 of the portion 7, adjacent the inner periphery 18 thereof when the bolts 30 are in place and the nut 31 tightened. As a result, the two portions 9 and 10 are coupled together and coupled in good frictional engagement to the member 5.

The means to facilitate lateral shifting of the novel mechanism A along the shaft B is, preferably, a roller 35 for each portion 9 and 10, providing a pair of spaced-apart roller bearings for the shaft B with the rollers 35 suitably pivotally supported within the slots 25 and with their peripheries extending, as in Figure 1, to permit the shaft B to ride thereon.

In the example shown, the outer periphery 17 of the inner portion 7 and the inner periphery 16 of the outer portion 6 may be provided with complementary semicircular, peripheral grooves 40 and 41 accommodating ball bearings 42, forming a race, whereby the portion 6 may rotate readily without rotation of the portion 7. The ball bearings 42 may be inserted conventionally and without invention, by boring a radial hole through the portion 6 from the bottom of the peripheral groove to the groove 41, the portions 6 and 7 assembled as in Fig. 1, the ball bearings 42 dropped through the bored hole and this hole then closed by a suitable plug.

The shaft B as shown has a portion 45 of non-circular transverse cross section, being square in transverse section, extending from a portion 46 of circular transverse section, and the portion 45 is slidably accommodated within the two openings 23, and has one edge 47 riding upon the rollers 35, whereby rotation of the shaft B will cause rotation of the member 8 and portion 7 of the member 5. Since the openings 23 are spaced from the axial centers of the portions 9 and 10, an eccentric motion will be imparted to the rotating member 8 and portion 7 mentioned and, consequently, to the portion 6 of the member 5.

For the purpose of illustration there is shown in Figure 4, in addition to the mechanism A and shaft B, rig C, including a bearing 50 for the shaft B carried by a suitable support 51 which support 51 also carries a drum 52 for a cable 53, which extends from the drum 52 downwardly to the mechanism A, around the lower portion of the grooved periphery 15 thereof and thence upwardly to and over a pulley 54 and, from there, downwardly into the well (not shown). Of course the cable 53 may support any tool desired, employed in drilling operations. Upon rotation of the shaft B the cable 53 will be reciprocated as desired, and as is now apparent.

When drilling tools are being pulled out or run into the well, rotation of the drum 52 will cause rotation of the portion 6 but not of the other portions of the novel mechanism A, and the ability of the mechanism A to slide longitudinally of the shaft B, will cause the cable 53 to spool evenly upon the drum 52, as is now obvious.

It is now apparent that the novel mechanism is not limited strictly to spudding operations, that the arrangement of parts eliminates the conventional beams on drilling machines and such parts as spudding shoes. A compact arrangement is therefore possible, with the elimination of parts, and consequent lowering of cost of materials.

Obviously, the openings 23 may be of suitable size as to accommodate a shaft of a suitable size. Since the portions 9 and 10 are detachable, portions having openings of suitable size may be substituted for others.

Various changes may be made to the form of the invention herein shown and described without departing from the spirit of the invention or scope of the claims.

What is claimed is:

1. In combination with a shaft including a shaft portion of non-circular transverse cross section and having a substantially straight edge, a spudding wheel comprising a pair of spaced-apart discs facing one another, each having an axially aligned opening accommodating said shaft portion for sliding of said discs longitudinally of said shaft, and a slot extending from the outer periphery of said discs to said opening; said opening being spaced from the axial center of the discs; a roller rotatably carried in said slot and with its periphery contacting said shaft portion at said straight edge, a rotatable member comprising an outermost ring-shaped portion having a cable-accommodating groove in its outer periphery, and an innermost ring-shaped portion with its outer periphery slidable over the inner periphery of said first named ring shaped portion; and means detachably securing said discs to said innermost ring-shaped portion only at the marginal sections of said discs and marginal section of said innermost ring-shaped portion.

2. In combination with a shaft including a shaft portion of non-circular transverse cross section and having substantially a straight edge, a spudding wheel comprising a pair of spaced-apart discs facing one another, each having an axially aligned opening accommodating said shaft portion for sliding of said discs longitudinally of said shaft, and a slot extending from the outer periphery of said discs to said opening, said opening being spaced from the axial center of the discs; a roller rotatably carried in said slot and with its periphery contacting said shaft portion at said straight edge, a rotatable member comprising an outermost ring-shaped portion having a cable-accommodating groove in its outer periphery, and an innermost ring-shaped portion with its outer periphery slidable over the inner periphery of said first named ring shaped portion; and clamping means detachably securing said discs to said innermost ring-shaped portion only, at the marginal sections of said discs and marginal portion of said innermost ring-shaped portion, said means being carried wholly by said discs inwardly of the inner periphery of said innermost ring-shaped portion.

WILLIAM MARK MAGNESS.

REFERENCES CITED

The following references are of record in the file of this patent:

UNITED STATES PATENTS

| Number | Name | Date |
|---|---|---|
| 505,443 | Darragh | Sept. 26, 1893 |

FOREIGN PATENTS

| Number | Country | Date |
|---|---|---|
| 526,862 | Great Britain | Sept. 27, 1940 |
| 686,105 | Germany | Jan. 3, 1940 |